United States Patent
Jacobsson et al.

(10) Patent No.: US 11,632,151 B2
(45) Date of Patent: Apr. 18, 2023

(54) METHOD AND APPARATUS FOR MASSIVE MU-MIMO

(71) Applicant: Telefonaktiebolaget LM Ericsson (publ), Stockholm (SE)

(72) Inventors: Sven Jacobsson, Gothenburg (SE); Mikael Coldrey, Borås (SE); Andreas Nilsson, Gothenburg (SE); Giuseppe Durisi, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 14 days.

(21) Appl. No.: 17/253,472

(22) PCT Filed: Jun. 20, 2018

(86) PCT No.: PCT/EP2018/066414
§ 371 (c)(1),
(2) Date: Dec. 17, 2020

(87) PCT Pub. No.: WO2019/242852
PCT Pub. Date: Dec. 26, 2019

(65) Prior Publication Data
US 2021/0320692 A1    Oct. 14, 2021

(51) Int. Cl.
*H04B 7/0452* (2017.01)
*H04B 7/0426* (2017.01)
(Continued)

(52) U.S. Cl.
CPC ......... *H04B 7/0452* (2013.01); *H04B 7/0426* (2013.01); *H04W 52/146* (2013.01);
(Continued)

(58) Field of Classification Search
None
See application file for complete search history.

(56) References Cited

U.S. PATENT DOCUMENTS

| | | | | |
|---|---|---|---|---|
| 5,712,850 A | * | 1/1998 | Elia | H04H 20/51 370/538 |
| 7,133,451 B2 | * | 11/2006 | Kim | H03M 7/40 375/E7.137 |

(Continued)

FOREIGN PATENT DOCUMENTS

| | | | | | |
|---|---|---|---|---|---|
| CN | 110447146 A | * | 11/2019 | ......... | H01L 23/4855 |
| CN | 112640379 A | * | 4/2021 | ............. | H04B 1/662 |

(Continued)

OTHER PUBLICATIONS

C. Kong, A. Mezghani, C. Zhong, A. L. Swindlehurst and Z. Zhang, "Multipair Massive MIMO Relaying Systems With One-Bit ADCs and DACs," in IEEE Transactions on Signal Processing, vol. 66, No. 11, pp. 2984-2997, Jun. 1, 2018, doi: 10.1109/TSP.2018.2816585. (Year: 2018).*

(Continued)

*Primary Examiner* — Berhanu Tadese
(74) *Attorney, Agent, or Firm* — Rothwell, Figg, Ernst & Manbeck, P.C.

(57) ABSTRACT

Disclosed is a method of a first wireless communication device configured for massive multi-user multiple-input multiple output (MU-MEMO) communication with two or more second wireless communication devices. The first wireless communication device comprises a plurality of antenna ports, each antenna port associated with at least one of a digital-to-analog converter (DAC) and an analog-to-digital converter (ADC). The method comprises acquiring an estimation of a communication channel between the first wireless communication device and the second wireless communication devices and acquiring an estimation of a quantization distortion caused by either DACs or ADCs. The method also comprises jointly determining (for the two or more second wireless communication devices) a transmission power and a transmission resource for each of the
(Continued)

second wireless communication devices, wherein the joint determination is based on the estimation of the communication channel and on the estimation of the quantization distortion. Corresponding apparatus, network node and computer program product are also disclosed.

19 Claims, 5 Drawing Sheets

(51) Int. Cl.
  *H04W 52/14* (2009.01)
  *H04W 52/24* (2009.01)
  *H04B 17/17* (2015.01)
  *H04W 52/26* (2009.01)
  *H04W 52/34* (2009.01)

(52) U.S. Cl.
  CPC ....... *H04W 52/242* (2013.01); *H04W 52/245* (2013.01); *H04B 17/17* (2015.01); *H04W 52/267* (2013.01); *H04W 52/346* (2013.01)

(56) References Cited

U.S. PATENT DOCUMENTS

| | | | | |
|---|---|---|---|---|
| 7,161,982 | B2* | 1/2007 | Kimoto | H04N 19/15 375/E7.176 |
| 7,164,719 | B2* | 1/2007 | Thyssen | H03M 3/388 375/243 |
| 7,418,147 | B2* | 8/2008 | Kamaci | H04N 19/61 375/E7.176 |
| 7,426,196 | B2* | 9/2008 | Gopalakrishnan | H04L 1/0007 370/395.42 |
| 7,551,932 | B2* | 6/2009 | Hans | H04W 16/16 455/434 |
| 7,904,098 | B2* | 3/2011 | Hans | H04W 16/16 455/456.2 |
| 8,164,496 | B2* | 4/2012 | Velazquez | H03F 1/3247 455/295 |
| 8,379,721 | B2* | 2/2013 | Wang | H04N 19/147 375/265 |
| 8,457,079 | B2* | 6/2013 | Krishnamurthy | H04W 72/0406 370/336 |
| 8,626,229 | B2* | 1/2014 | Abgrall | H04W 52/267 370/328 |
| 8,711,926 | B2* | 4/2014 | Malayath | H04N 19/154 375/240.03 |
| 8,737,309 | B2* | 5/2014 | Strinati | H04L 1/0003 370/252 |
| 8,767,610 | B2* | 7/2014 | Kim | H04L 5/0035 370/339 |
| 8,767,637 | B2* | 7/2014 | Novak | H04W 72/042 370/347 |
| 8,811,319 | B2* | 8/2014 | Shen | H04W 52/16 370/341 |
| 8,914,052 | B2* | 12/2014 | Hui | H03M 7/3082 375/240.18 |
| 9,054,771 | B2* | 6/2015 | Kim | H04L 5/0048 |
| 9,118,453 | B2* | 8/2015 | Nishio | H04L 5/0044 |
| 9,307,535 | B1* | 4/2016 | Singh | H04W 52/346 |
| 9,363,808 | B2* | 6/2016 | Kim | H04W 72/042 |
| 9,722,677 | B2* | 8/2017 | Hui | H04W 28/06 |
| 10,057,916 | B2* | 8/2018 | Barabell | H04W 72/046 |
| 10,142,946 | B2* | 11/2018 | Choi | H04W 52/242 |
| 10,264,535 | B2* | 4/2019 | Kwak | H04W 8/005 |
| 10,321,416 | B2* | 6/2019 | Tiirola | H04W 52/241 |
| 10,447,504 | B1* | 10/2019 | Yilmaz | H03D 3/006 |
| 10,448,351 | B2* | 10/2019 | Yoo | H04W 56/003 |
| 10,512,089 | B2* | 12/2019 | Lee | H04W 72/048 |
| 10,623,740 | B2* | 4/2020 | Andersson | H04N 19/124 |
| 11,082,997 | B2* | 8/2021 | Barabell | H04W 72/1263 |
| 2007/0097901 | A1* | 5/2007 | Tirkkonen | H04L 27/2626 370/318 |
| 2009/0011770 | A1* | 1/2009 | Jung | H04W 76/14 455/452.1 |
| 2009/0273374 | A1* | 11/2009 | Wang | G05F 1/561 327/103 |
| 2011/0260898 | A1* | 10/2011 | Velazquez | H03F 1/3258 341/110 |
| 2012/0157155 | A1* | 6/2012 | Cho | H04W 52/54 455/522 |
| 2012/0190389 | A1* | 7/2012 | Hui | H04B 7/024 455/500 |
| 2013/0010859 | A1* | 1/2013 | Schwaab | H04N 19/172 375/240.03 |
| 2013/0083767 | A1* | 4/2013 | Goto | H04L 27/2636 370/329 |
| 2013/0208677 | A1* | 8/2013 | Lee | H04L 1/0078 370/329 |
| 2015/0071174 | A1* | 3/2015 | Hui | H03M 7/3075 370/328 |
| 2015/0256832 | A1* | 9/2015 | Pearson | H04N 19/176 375/240.03 |
| 2016/0037550 | A1* | 2/2016 | Barabell | H04W 72/1263 455/450 |
| 2017/0141908 | A1* | 5/2017 | Kim | H04B 7/2615 |
| 2017/0150182 | A1* | 5/2017 | Carlavan | H04N 19/91 |
| 2017/0207888 | A1* | 7/2017 | Novak | H04W 72/04 |
| 2017/0244501 | A1* | 8/2017 | Yasukawa | G01S 13/74 |
| 2017/0339702 | A1* | 11/2017 | Zhao | H04W 28/10 |
| 2018/0049180 | A1* | 2/2018 | Lee | H04W 52/283 |
| 2018/0091260 | A1* | 3/2018 | Gatherer | H03M 1/007 |
| 2018/0262288 | A1* | 9/2018 | Gao | H04L 5/0014 |
| 2018/0278934 | A1* | 9/2018 | Andersson | H04N 19/124 |
| 2018/0352561 | A1* | 12/2018 | Barabell | H04B 17/318 |
| 2020/0077304 | A1* | 3/2020 | Sandberg | H04W 28/0257 |
| 2020/0091608 | A1* | 3/2020 | Alpman | H01Q 25/001 |
| 2020/0092901 | A1* | 3/2020 | Barabell | H04W 72/1263 |
| 2021/0014695 | A1* | 1/2021 | Minotani | H04W 24/10 |
| 2021/0314975 | A1* | 10/2021 | Barabell | H04W 72/046 |
| 2021/0320692 | A1* | 10/2021 | Jacobsson | H04B 7/0426 |

FOREIGN PATENT DOCUMENTS

| | | | | |
|---|---|---|---|---|
| EP | 2012443 | A2 * | 1/2009 | ........... H04L 5/0037 |
| EP | 3811690 | A1 * | 4/2021 | ........... H04B 7/0426 |
| TW | 200835163 | A * | 8/2008 | ........... H03M 1/002 |
| WO | WO-9938261 | A1 * | 7/1999 | ........... H03M 7/3082 |
| WO | WO-2016089087 | A1 * | 6/2016 | ......... H04W 52/242 |
| WO | WO-2019242852 | A1 * | 12/2019 | ........... H04B 7/0426 |
| WO | WO-2020051146 | A1 * | 3/2020 | ............. H04B 1/662 |

OTHER PUBLICATIONS

L. Fan, S. Jin, C. Wen and H. Zhang, "Uplink Achievable Rate for Massive MIMO Systems With Low-Resolution ADC," in IEEE Communications Letters, vol. 19, No. 12, pp. 2186-2189, Dec. 2015, doi: 10.1109/LCOMM.2015.2494600. (Year: 2015).*

Y. Li, C. Tao, L. Liu, G. Seco-Granados and A. L. Swindlehurst, "Channel estimation and uplink achievable rates in one-bit massive MIMO systems," 2016 IEEE Sensor Array and Multichannel Signal Processing Workshop (SAM), 2016, pp. 1-5, doi: 10.1109/SAM. 2016.7569618. (Year: 2016).*

J. Dai, J. Liu, J. Wang, J. Zhao, C. Cheng and J. -Y. Wang, "Achievable Rates for Full-Duplex Massive MIMO Systems With Low-Resolution ADCs/DACs," in IEEE Access, vol. 7, pp. 24343-24353, 2019, doi: 10.1109/ACCESS.2019.2900273. (Year: 2019).*

H. Q. Ngo, H. A. Suraweera, M. Matthaiou and E. G. Larsson, "Multipair Full-Duplex Relaying With Massive Arrays and Linear Processing," in IEEE Journal on Selected Areas in Communications, vol. 32, No. 9, pp. 1721-1737, Sep. 2014, doi: 10.1109/JSAC. 2014.2330091. (Year: 2014).*

Jacobsson et al. Throughput Analysis of Massive MIMO Uplink with Low-Resolution ADCs, arXiv, Apr. 2017 (Year: 2017).*

A. Silva and S. M. Jesus, "A post-detection Maximum Ratio Combiner: Experimental assessment on high diversity underwater channels," International Workshop on Systems, Signal Processing and their Applications, WOSSPA, 2011, pp. 335-338, doi: 10.1109/

(56) References Cited

OTHER PUBLICATIONS

WOSSPA.2011.5931505. (Year: 2011).*
Li et al. Channel estimation and uplink achievable rates in 1-bit massive MIMO systems, IEEE 2016 (Year: 2016).*
Kong et al. Multipair Massive MIMO Relaying Systems With One-Bit ADCs and DACs, IEEE Jun. 2018 (Year: 2018).*
International Search Report and Written Opinion dated Feb. 26, 2019 in International Application No. PCT/EP2018/066414 (9 pages total).
Mollen, C., et al., "Achievable Uplink Rates for Massive MIMO with Coarse Quantization", 2017 IEEE International Conference on Acoustics, Speech and Signal Processing (ICASSP), Mar. 5, 2017, pp. 6488-6492, DOI: 10.1109/ICASSP.2017.7953406.
Pirzadeh, H., et al., "Spectral Efficiency of Mixed-ADC Massive MIMO", IEEE Transactions on Signal Processing, vol. 66, No. 13, Jul. 1, 2018, pp. 3599-3613, XP011685130, ISSN: 1053-587X, DOI:10.1109/TSP.2018.2833807.
Li, Y., et al., "Channel Estimation and Performance Analysis of One-Bit Massive MIMO Systems", IEEE Transactions on Signal Processing, vol. 65, No. 15, Aug. 1, 2017, pp. 4075-4089.
Jacobsson, S., et al., "Linear Precoding with Low-Resolution DACs for Massive MU-MIMO-OFDM Downlink", IEEE Transactions on Communication, Sep. 14, 2017, pp. 1-13. https://arxiv.org/abs/1709.04846.
Jacobsson, S., et al., "Quantized Precoding for Massive MU-MIMO", IEEE Transactions on Communications, vol. 65, No. 11, Nov. 2017, pp. 4670-4684.
Jacobsson, S., et al., "Throughput Analysis of Massive MIMO Uplink With Low-Resolution ADCs", IEEE Transactions on Wireless Communications, vol. 16, No. 6, Jun. 2017, pp. 4038-4051.
Mollen, C. et al., "Uplink Performance of Wideband Massive MIMO With One-Bit ADCs", IEEE Transactions on Wireless Communications, vol. 16, No. 1, Jan. 2017, pp. 87-100.
Saxena, A.K., et al., "Analysis of One-Bit Quantized Precoding for the Multiuser Massive MIMO Downlink", IEEE Transactions on Signal Processing, vol. 65, No. 17, Sep. 2017, pp. 4624-4634.
Studer, C. et al., "Quantized Massive MU-MIMO-OFDM Uplink", IEEE Transactions on Communications, vol. 64, No. 6, Jun. 2016, pp. 2387-2399.

* cited by examiner

METHOD AND APPARATUS FOR MASSIVE MU-MIMO

CROSS REFERENCE TO RELATED APPLICATION(S)

This application is a 35 U.S.C. § 371 National Stage of International Patent Application No. PCT/EP2018/066414, filed Jun. 20, 2018, designating the United States.

TECHNICAL FIELD

The present disclosure relates generally to the field of wireless communication. More particularly, it relates to wireless communication using massive multi-user multiple-input multiple-output (MU-MIMO).

BACKGROUND

Massive multi-user multiple-input multiple-output (MU-MIMO) is one technology solution approach considered for use in wireless communication systems currently being developed. One example of such wireless communication systems is new radio (NR), but massive MU-MIMO and the disclosure herein may generally be applicable in association with any suitable wireless communication systems.

Massive MU-MIMO has the potential to provide significant gains in spectral efficiency and/or energy efficiency, and may be realized by equipping a communication node (e.g., a network node such as a radio base station; RBS) with a large amount (e.g., hundreds) of antenna elements and applying beamforming; thereby enabling serving of a plurality (e.g., up to tens) of user terminals (e.g. user terminals, user equipments; UEs) in the same time-frequency resource through spatial multiplexing.

Due to the huge amount of antenna elements, an associated huge amount of data converters (i.e., analog-to-digital converters—ADCs—and digital-to-analog converters—DACs) is needed.

Typically there may be one ADC and one DAC per antenna element; or per pair of orthogonally oriented antenna elements. Alternatively, a subset of the antenna elements may share one ADC and one DAC, but in any case the data converters are typically many enough to be one of the major sources of power consumption in massive MU-MIMO communication nodes.

The power consumption of data converters typically increases exponentially with the number of bits per time unit (the quantization resolution). Therefore, it is desirable to keep quantization resolution at a relatively low level (e.g., compared to typical quantization resolutions for non-massive MIMO) in order to keep the power consumption at a reasonable level. Furthermore, the large amount of raw data that has to be shuffled to, and from, the data converters in massive MU-MIMO also calls for use of low resolution data converters.

In some circumstances, massive MU-MIMO is somewhat tolerant to the use of low resolution data converters for receiver nodes.

Such circumstances depend, in the case of MU-MIMO reception, on the received power from different transmitters being comparatively similar; e.g., within a limited range. In realistic scenarios, however, this cannot be assumed to hold true. For example, the powers received by a radio base station from different UEs depends on the geometry of the cell and on the transmit power of the different UEs. Hence, the power received from different UEs could be significantly different.

This near-far effect is one example scenario which leads to problems if low resolution data converters are used. The problems are due to the quantization distortion of the data converters being higher the lower the resolution is applied. In essence, the signal from a weak (low received power) UE will drown in the distortion caused by a strong (high received power) UE.

The near-far effect is problematic also in the case of MU-MIMO transmission, since more power is directed towards UEs that experience high attenuation than towards UEs that experience low attenuation. The quantization distortion caused by the low resolution data converters and associated with such high attenuation UEs will then significantly impair the signal directed towards UEs that experience low attenuation.

Therefore, there is a need for alternative approaches for massive MU-MIMO. Preferably, such approaches should be able to accommodate users with substantially different power conditions, while mitigating the near-far problems exemplified above.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a method of a first wireless communication device configured for massive multi-user multiple-input multiple output (MU-MIMO) communication with two or more second wireless communication devices. The first wireless communication device comprises a plurality of antenna ports, each antenna port associated with at least one of a digital-to-analog converter (DAC) and an analog-to-digital converter (ADC).

The method comprises acquiring an estimation of a communication channel between the first wireless communication device and the second wireless communication devices, and acquiring an estimation of a quantization distortion caused by either DACs or ADCs.

The method also comprises jointly determining (for the two or more second wireless communication devices) a transmission power and a transmission resource for each of the second wireless communication devices, wherein the joint determination is based on the estimation of the communication channel and on the estimation of the quantization distortion.

In some embodiments, jointly determining comprises optimizing a performance metric over an ensemble of possible transmission power values and of possible transmission resource values, wherein the performance metric is based on the estimation of the communication channel and on the estimation of the quantization distortion.

In some embodiments, the performance metric is a worst case device throughput for the second wireless communication devices, and optimizing the performance metric comprises maximizing the worst case device throughput.

In some embodiments, the performance metric is an overall throughput for the second wireless communication devices, and optimizing the performance metric comprises maximizing the overall throughput.

In some embodiments, the performance metric is a combined throughput metric comprising a combination of a worst case device throughput for the second wireless communication devices and an overall throughput for the second wireless communication devices, and optimizing the performance metric comprises maximizing the combined throughput metric.

In some embodiments, acquiring the estimation of the quantization distortion comprises estimating the quantization distortion based on parameters of the DACs or the ADCs.

In some embodiments, estimating the quantization distortion is further based on the estimation of the communication channel.

In some embodiments, the first wireless communication device comprises a wireless transmitter wherein each antenna port is associated with a DAC, and wherein the quantization distortion is caused by the DACs. Then, the method may further comprise transmitting signals to the second wireless communication devices according to the determined transmission powers and transmission resources.

In some embodiments, acquiring the estimation of the communication channel comprises receiving respective indications of the estimation of the communication channel from the second wireless communication devices.

In some embodiments, the first wireless communication device comprises a wireless receiver wherein each antenna port is associated with an ADC, and wherein the quantization distortion is caused by the ADCs. Then, the method may further comprise transmitting an indication of the determined transmission power and transmission resource to each of the second wireless communication devices.

In some embodiments, acquiring the estimation of the communication channel comprises receiving reference signals from the second wireless communication devices and estimating the communication channel based on the received reference signals.

In some embodiments, the first wireless communication device is a network node and second wireless communication devices are user terminals.

In some embodiments, the first wireless communication device comprises a plurality of antenna elements, and wherein each antenna port is associated with one or more of the antenna elements.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for a first wireless communication device configured for massive multi-user multiple-input multiple output (MU-MIMO) communication with two or more second wireless communication devices. The first wireless communication device comprises a plurality of antenna ports, each antenna port associated with at least one of a digital-to-analog converter (DAC) and an analog-to-digital converter (ADC).

The arrangement comprises controlling circuitry configured to cause acquisition of an estimation of a communication channel between the first wireless communication device and the second wireless communication devices, and acquisition of an estimation of a quantization distortion caused by either DACs or ADCs.

The controlling circuitry is also configured to cause joint determination (for the two or more second wireless communication devices) of a transmission power and a transmission resource for each of the second wireless communication devices, wherein the joint determination is based on the estimation of the communication channel and on the estimation of the quantization distortion.

A fourth aspect is a network node comprising the apparatus of the third aspect.

In some embodiments, any of the above aspects may additionally have features identical with or corresponding to any of the various features as explained above for any of the other aspects.

An advantage of some embodiments is that alternative approaches for massive MU-MIMO are provided.

Another advantage of some embodiments is users with substantially different power conditions can be accommodated.

Yet an advantage of some embodiments is that mitigation of near-far problems may be accomplished.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments of alternative approaches for massive MU-MIMO will be described where it is determined jointly which transmission power and transmission resource to use for each wireless communication device. Generally, the joint determination is based on an estimation of the communication channel and on an estimation of the quantization distortion.

Figure 1:
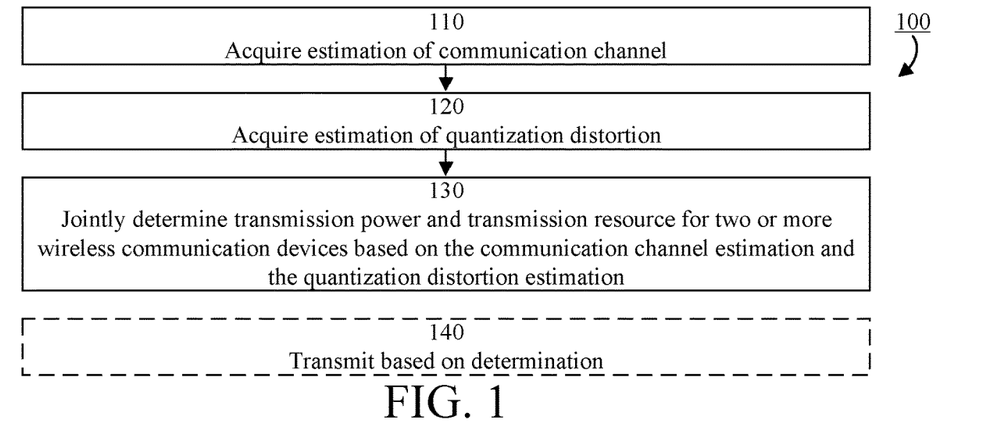
FIG. 1 is a flowchart illustrating example method steps according to some embodiments.

FIG. 1 illustrates an example method 100 according to some embodiments. The method is performed by a first wireless communication device (e.g., a network node) configured for massive MU-MIMO communication with two or more second wireless communication devices (e.g., user terminals).

The first wireless communication device comprises a plurality of antenna ports, and each antenna port is associated with at least one of a DAC and an ADC. Typically, the first wireless communication device comprises a plurality of antenna elements, and each antenna port is associated with one or more of the antenna elements.

In some embodiments, there is a one-to-one correspondence between the antenna ports and the antenna elements, i.e., each antenna port is associated with exactly one of the antenna elements.

When each antenna port is associated with more than one of the antenna elements, the association between each antenna port and the antenna elements may be via a suitable signal distribution network comprising phase shifting circuitry. This approach may be seen as a hybrid architecture, where part of the beam-forming is performed in the analog domain.

In step 110, an estimation is acquired of a communication channel between the first wireless communication device and the second wireless communication devices. The estimation of the communication channel may be acquired by any suitable—known or future—approach.

For example, acquiring the estimation of the communication channel may comprise receiving reference signals (e.g., pilot symbols) from the second wireless communication devices and estimating the communication channel (e.g., determining a channel state information; CSI) based on the received reference signals. The estimation of the communication channel may be performed using any suitable—known or future—approach for channel estimation. Alternatively or additionally, acquiring the estimation of the communication channel may comprise receiving respective indications of the estimation of the communication channel from the second wireless communication devices. In these examples, the estimation of the communication channel may be performed by the second wireless communication devices using any suitable—known or future—approach for channel estimation. Typically, each of the second wireless communication devices estimates, e.g., based on reference signaling from the first wireless communication device, a respective part of the communication channel (the part associated with that particular second wireless communication device) and the respective indication is indicative of the estimation of the respective part of the communication channel.

In step 120, an estimation of a quantization distortion caused by either DACs (when a wireless transmitter of the first wireless communication device is to be used) or ADCs (when a wireless receiver of the first wireless communication device is to be used) is acquired. The estimation of the quantization distortion may be acquired by any suitable—known or future—approach.

For example, acquiring the estimation of the quantization distortion may comprise estimating the quantization distortion based on parameters of the DACs/ADCs. Such parameters may be known (e.g., from the DAC/ADC design and/or configuration). Alternatively, such parameters may, themselves, be estimated (e.g., based on the DAC/ADC design and/or configuration). Such estimation may be performed in association with a calibration procedure.

The estimation of a quantization distortion may be an estimation of resulting distortion levels after beamforming (measured, e.g., in terms of signal-to-interference-noise-and-distortion ratio; SINDR).

In some embodiments, estimating the quantization distortion may be further based on the acquired estimation of the communication channel. For example, estimating the quantization distortion may be based on the differences in path gain and/or received power between the different second wireless communication devices.

According to a particular example applicable to the uplink, the quantization distortion of the ADCs depends on ADC parameters, the transmit powers of the second wireless communication devices, and the communication channel (for example, but not limited to, the path gain). According to a particular example applicable to the downlink, the quantization distortion of the DACs depends on DAC parameters, the transmit powers of the first wireless communication device in relation to the second wireless communication devices, and the communication channel (for example, but not limited to, the path gain).

In step 130, a transmission power and a transmission resource is determined for each of the second wireless communication devices. A transmission resource may typically refer to a time resource (e.g., a time slot or similar) and/or a frequency resource (e.g., a sub-carrier or similar).

The determination is a joint determination and is based on the estimation of the communication channel and on the estimation of the quantization distortion. The determination may be joint for the second wireless communication devices and/or may be joint for the transmission power and the transmission resource.

The joint determination may, for example, comprise optimizing a performance metric over an ensemble of possible transmission power values and of possible transmission resource values, wherein the performance metric is based on the estimation of the communication channel and on the estimation of the quantization distortion.

The performance metric may be a worst case device throughput for the second wireless communication devices, and optimizing the performance metric may comprise maximizing the worst case device throughput.

The performance metric may be an overall throughput for the second wireless communication devices, and optimizing the performance metric may comprise maximizing the overall throughput.

If there are two second wireless communication devices, K=2, maximizing the worst case device throughput may be exemplified as solving the optimization problem $\max_{\alpha_1,\alpha_2,\gamma_1,\gamma_2} \min_{k \in \{1,2\}} R_k(\hat{H}, \alpha_1, \alpha_2, \gamma_1, \gamma_2)$ and maximizing the overall throughput may be exemplified as solving the optimization problem $\max_{\alpha_1,\alpha_2,\gamma_1,\gamma_2} \Sigma_{k \in \{1,2\}} R_k(\hat{H}, \alpha_1, \alpha_2, \gamma_1, \gamma_2)$, where $R_k(\hat{H}, \alpha_1, \alpha_2, \gamma_1, \gamma_2)$ is the achievable rate of the $k^{th}$ device (k=1, . . . , K, i.e., k∈{1,2}), $\hat{H}$ is an estimate of the communication channel (expressed as a channel matrix), $\gamma_k$ is the transmit power ($\gamma_{min} \leq \gamma_1 \leq \gamma_{max}$) of the $k^{th}$ device, $\alpha_k$ is the time slot associated with the $k^{th}$ device ($\alpha_k \subseteq [0,1]$ with $\cup_k \alpha_k=[0, 1]$ and $\cap_k \alpha_k=\{0,1\}$, i.e., either the two UEs occupy the same time-slot or they occupy two orthogonal time slots).

Assuming Gaussian signaling and assuming that nearest neighbor detection is used, $R_k(\hat{H}, \alpha_1, \alpha_2, \gamma_1, \gamma_2) > \beta_k \log_2(1+ \text{SINDR}_k(\hat{H}, \alpha_1, \alpha_2, \gamma_1, \gamma_2))$ represents a lower bound of the achievable rate for the $k^{th}$ device, where $\beta_k=|\alpha_k|$.

It should be noted that the example above is only a very simple example provided for illustration. Indeed, this example assumes that the two second wireless communication devices share the same frequency spectrum and that the channel is flat fading (no frequency selectivity).

The performance metric may be a combined throughput metric comprising a combination of a worst case device throughput for the second wireless communication devices and an overall throughput for the second wireless communication devices, and optimizing the performance metric may comprise maximizing the combined throughput metric.

Other performance metrics are, of course, possible. For example, an error-rate probability may be used as the performance metric according to some embodiments.

In optional step 140, transmission is performed based on the determined transmission powers and transmission resources.

Figure 2:
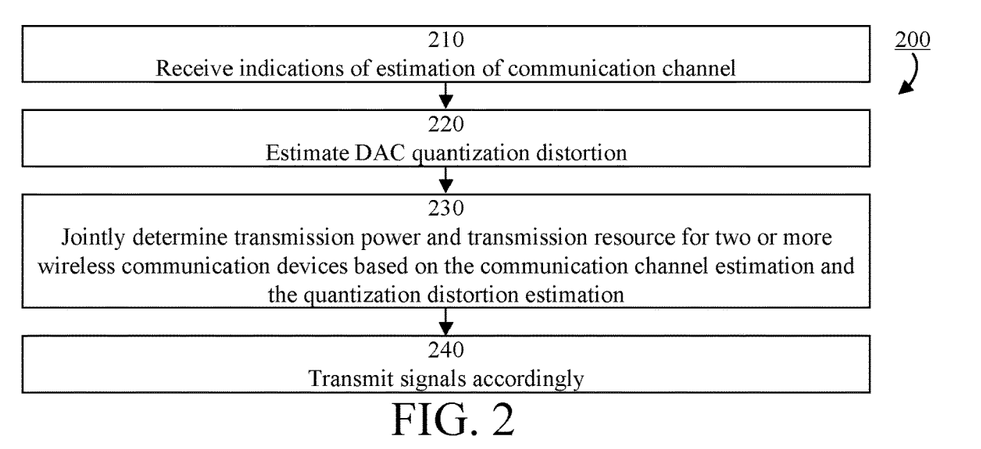
FIG. 2 is a flowchart illustrating example method steps according to some embodiments.

FIG. 2 illustrates an example method 200 according to some embodiments. The example method 200 may be seen as a further exemplification of the example method 100 of FIG. 1 according to some embodiments.

The method is performed by a first wireless communication device (e.g., a network node) comprising a wireless transmitter configured for massive MU-MIMO communication with two or more second wireless communication devices (e.g., user terminals).

The first wireless communication device comprises a plurality of antenna ports, and each antenna port is associated with a DAC.

In step 210, respective indications are received from the second wireless communication devices, wherein the respective indications are indicative of an estimation of a (respective part of a) communication channel between the first wireless communication device and the second wireless communication devices (compare with step 110 of FIG. 1).

In step 220, an estimation of a quantization distortion caused by the DACs is acquired (compare with step 120 of FIG. 1).

In step 230, a transmission power and a transmission resource is determined for each of the second wireless communication devices (compare with step 130 of FIG. 1).

In step 240, signals are transmitted to the second wireless communication devices according to the determined transmission powers and transmission resources (compare with step 140 of FIG. 1).

Figure 3:
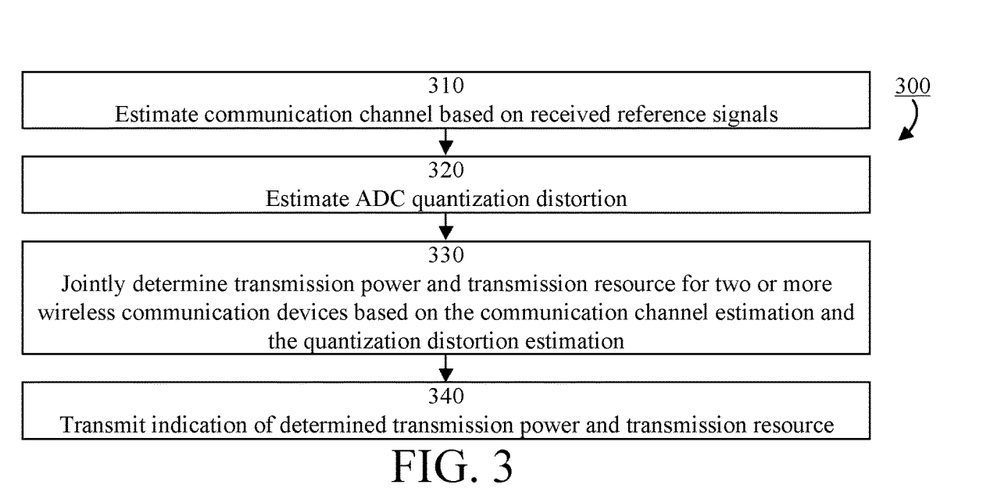
FIG. 3 is a flowchart illustrating example method steps according to some embodiments.

FIG. 3 illustrates an example method 300 according to some embodiments. The example method 300 may be seen as a further exemplification of the example method 100 of FIG. 1 according to some embodiments.

The method is performed by a first wireless communication device (e.g., a network node) comprising a wireless receiver configured for massive MU-MIMO communication with two or more second wireless communication devices (e.g., user terminals).

The first wireless communication device comprises a plurality of antenna ports, and each antenna port is associated with an ADC.

In step 310, the communication channel between the first wireless communication device and the second wireless communication devices is estimates based on received reference signals (compare with step 110 of FIG. 1).

In step 320, an estimation of a quantization distortion caused by the ADCs is acquired (compare with step 120 of FIG. 1).

In step 330, a transmission power and a transmission resource is determined for each of the second wireless communication devices (compare with step 130 of FIG. 1).

In step 340, an indication of the determined transmission power and transmission resource is transmitted to each of the second wireless communication devices (compare with step 140 of FIG. 1). The indication may comprise one dedicated indication per second wireless communication device (i.e., each second wireless communication device gets an indication of only the determined transmission power and transmission resource it should use). Alternatively, the indication may comprise a common (e.g., broadcast) indication for all second wireless communication devices (i.e., each second wireless communication device should be configured to determine the determined transmission power and transmission resource it should use from the common indication).

Figure 4:
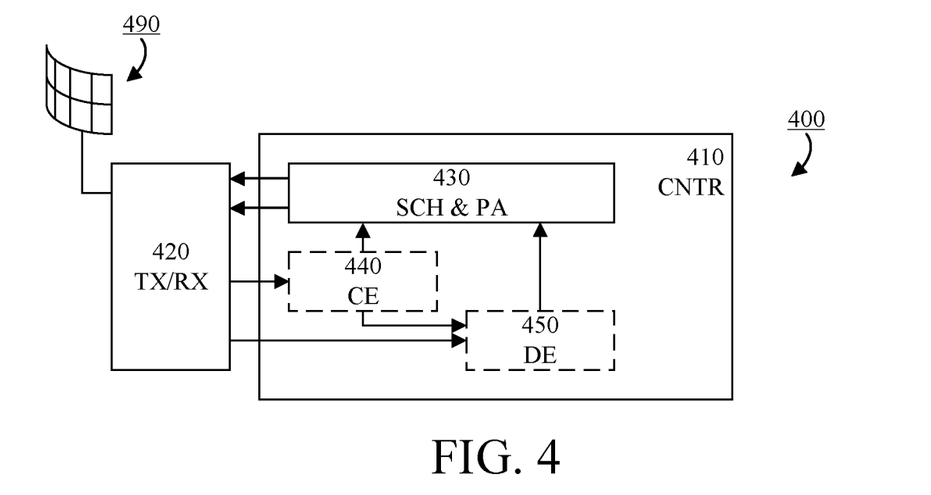
FIG. 4 is a schematic block diagram illustrating an example apparatus according to some embodiments.

FIG. 4 schematically illustrates an example apparatus 400 for a first wireless communication device (e.g., a network node) configured for massive MU-MIMO communication with two or more second wireless communication devices (e.g., user terminals). For example, the apparatus 400 may be configured to perform one or more of the method steps described in connection to any of FIGS. 1-3.

The first wireless communication device comprises a plurality of antenna ports, and each antenna port is associated with at least one of a DAC and an ADC. Typically, the first wireless communication device comprises a plurality of antenna elements (e.g., collected in an antenna array 490), and each antenna port is associated with one or more of the antenna elements as explained in connection with FIG. 1.

The arrangement comprises controlling circuitry (e.g., a controller; CNTR) 410 configured to cause acquisition of an estimation of a communication channel between the first wireless communication device and the second wireless communication devices (compare with steps 110, 210, 310).

In some embodiments (e.g., when the first wireless communication device comprises a wireless transmitter), the acquisition of the estimation of the communication channel may comprise reception of respective indications of the estimation of the communication channel from the second wireless communication devices. To this end, the controlling circuitry may comprise, or be otherwise associated with, receiving circuitry (e.g., a receiver; RX) 420 configured to receive the respective indications. The receiving circuitry may, or may not, be comprised in the apparatus 400.

In some embodiments (e.g., when the first wireless communication device comprises a wireless receiver), the acquisition of the estimation of the communication channel may comprise reception of reference signals from the second wireless communication devices and estimation of the communication channel based on the received reference signals. To this end, the controlling circuitry may comprise, or be otherwise associated with, receiving circuitry (e.g., a receiver; RX) 420 configured to receive the reference signals. The receiving circuitry may, or may not, be comprised in the apparatus 400. Furthermore, the controlling circuitry may comprise, or be otherwise associated with, channel estimating circuitry (e.g., a channel estimator; CE) 440 configured to estimate the channel based on the received reference signals. The channel estimating circuitry may, or may not, be comprised in the apparatus 400.

The controlling circuitry 410 is also configured to cause acquisition of an estimation of a quantization distortion caused by either DACs or ADCs (compare with steps 120, 220, 320). To this end, the controlling circuitry may comprise, or be otherwise associated with, distortion estimating circuitry (e.g., a distortion estimator; DE) 450 configured to estimate the distortion. The distortion estimating circuitry may, or may not, be comprised in the apparatus 400. The estimation of the quantization distortion may be based on parameters of the DACs/ADCs comprised in transceiving circuitry (e.g. a transceiver; TX/RX) 420 and/or on the estimation of the communication channel.

The controlling circuitry 410 is also configured to cause joint determination, for the two or more second wireless communication devices, of a transmission power and a transmission resource for each of the second wireless communication devices, wherein the joint determination is based on the estimation of the communication channel and on the estimation of the quantization distortion (compare with steps 130, 230, 330). To this end, the controlling circuitry may comprise, or be otherwise associated with, scheduling and power allocation circuitry (e.g., a scheduler and power allocator; SCH & PA) 430 configured to perform the joint determination.

The scheduling and power allocation circuitry may, or may not, be comprised in the apparatus 400.

The controlling circuitry 410 is also configured to cause transmission based on the determined transmission powers and transmission resources (compare with steps 140, 240, 340). To this end, the controlling circuitry may comprise, or be otherwise associated with, transmitting circuitry (e.g., a transmitter; TX) 420 configured to transmit based on the determined transmission powers and transmission resources. The transmitting circuitry may, or may not, be comprised in the apparatus 400.

Generally, the solutions proposed herein mitigates, at least to some extent, the aforementioned near-far problem for low resolution quantized massive MU-MIMO by taking into account the level of distortion caused by low resolution ADCs and DACs when performing quantization-aware joint power allocation and scheduling (e.g., at a network node).

In some scenarios, the solutions proposed herein may also enable reduction of transmit power; e.g., for the second wireless communication devices in the uplink. In the uplink, the solutions proposed herein may cause the second wireless communication devices with good channel conditions to back off in transmit power to reduce their impact due to quantization distortion at the first wireless communication device. This may, in turn, improve the battery life time of the devices.

Generally, the solutions proposed herein enables the use of low resolution data converters (ADCs and DACs) at the first wireless communication device. This may, in turn, typically lead to significant reductions in circuit power consumption and/or system costs at the first wireless communication device.

Compared to existing solutions, the solutions proposed herein may enable, in uplink low resolution quantized massive MU-MIMO systems, successful detection of signals transmitted from low-power (e.g., cell-edge) devices; even in the presence of high-power interference from other high-power (e.g., non-cell-edge) devices.

Figure 5A:
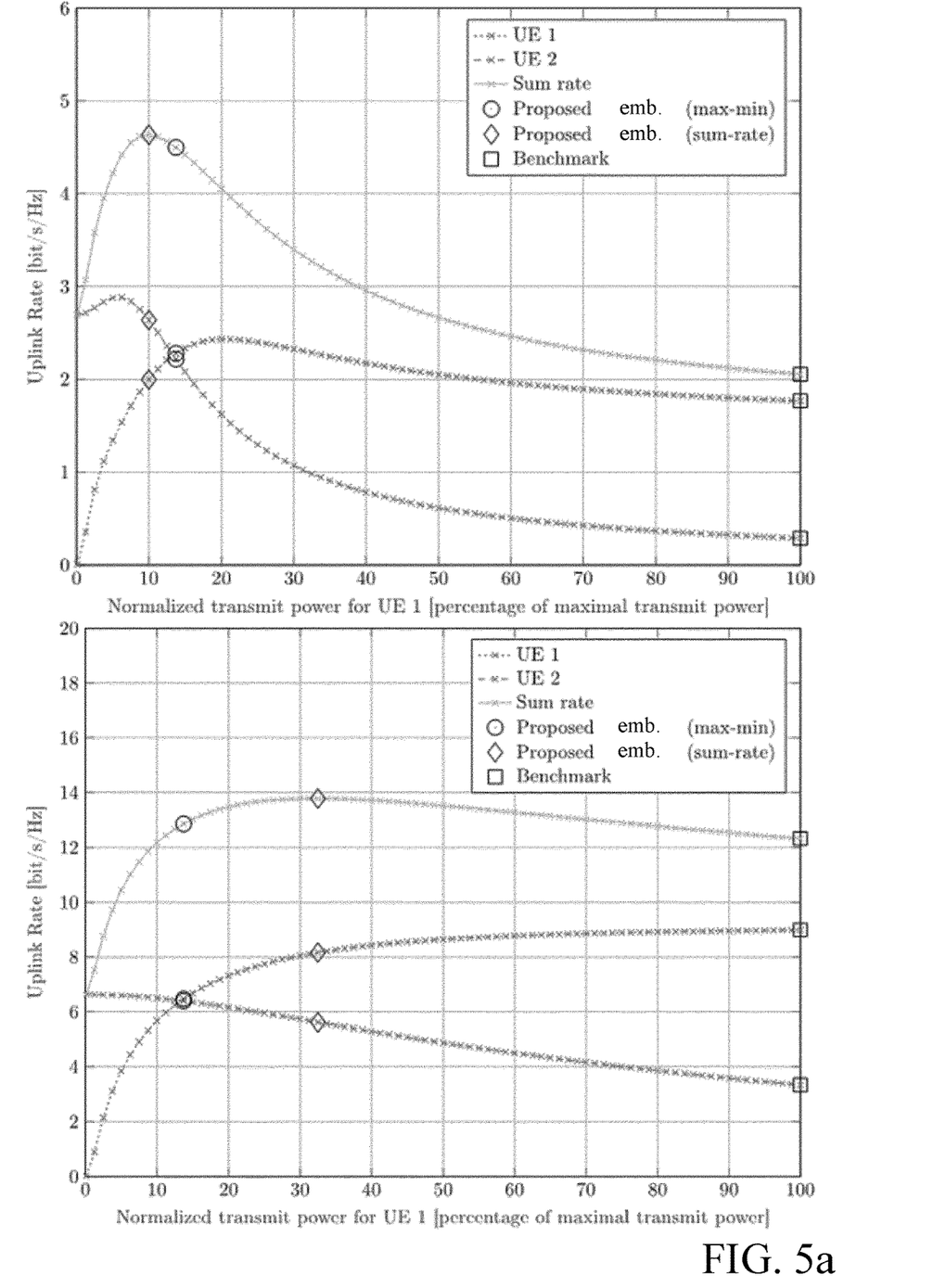
FIGS. 5a, 5b and 5c are plots illustrating measurements for various scenarios according to some embodiments.
Figure 5B:
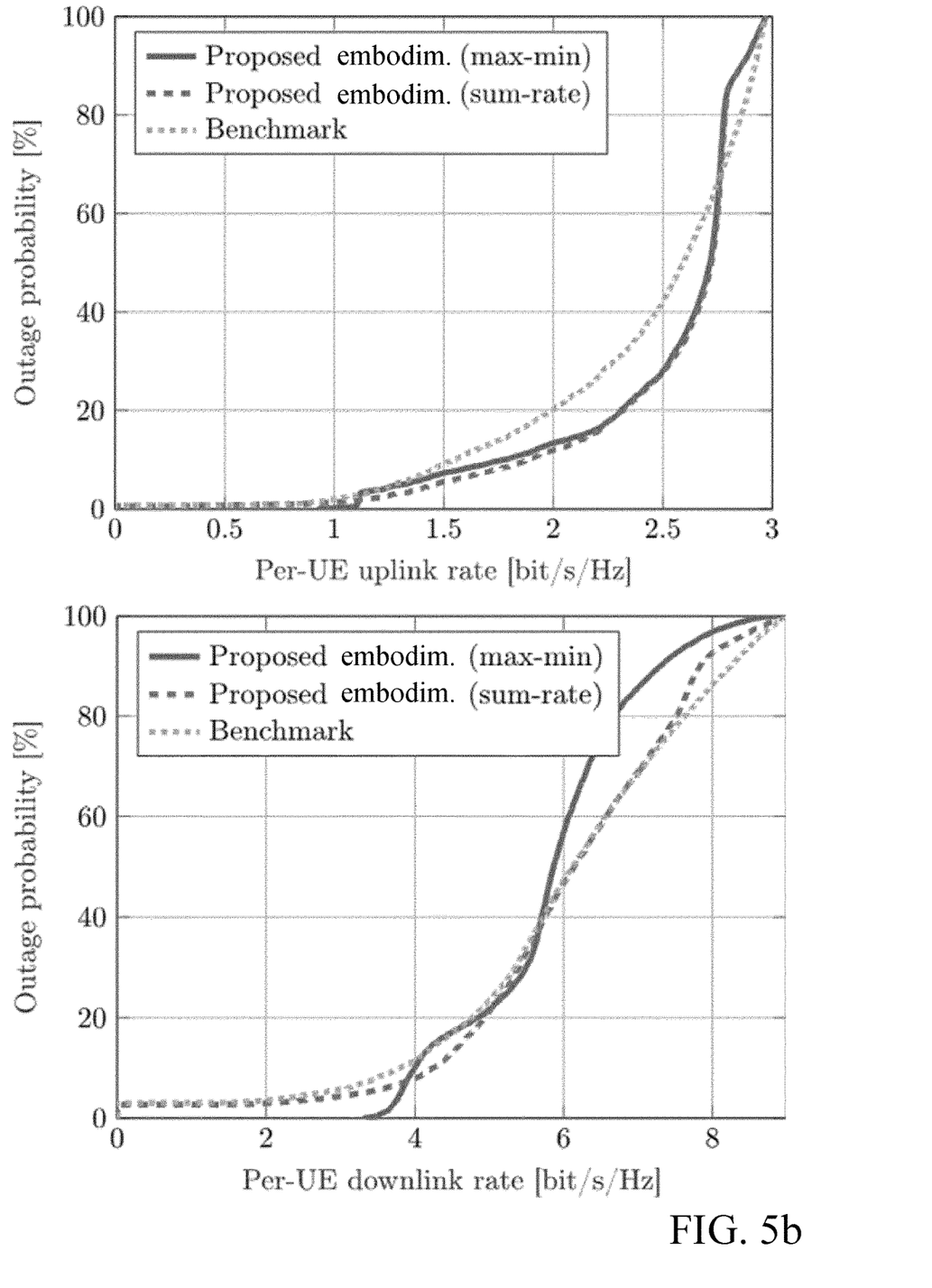
Figure 5C:
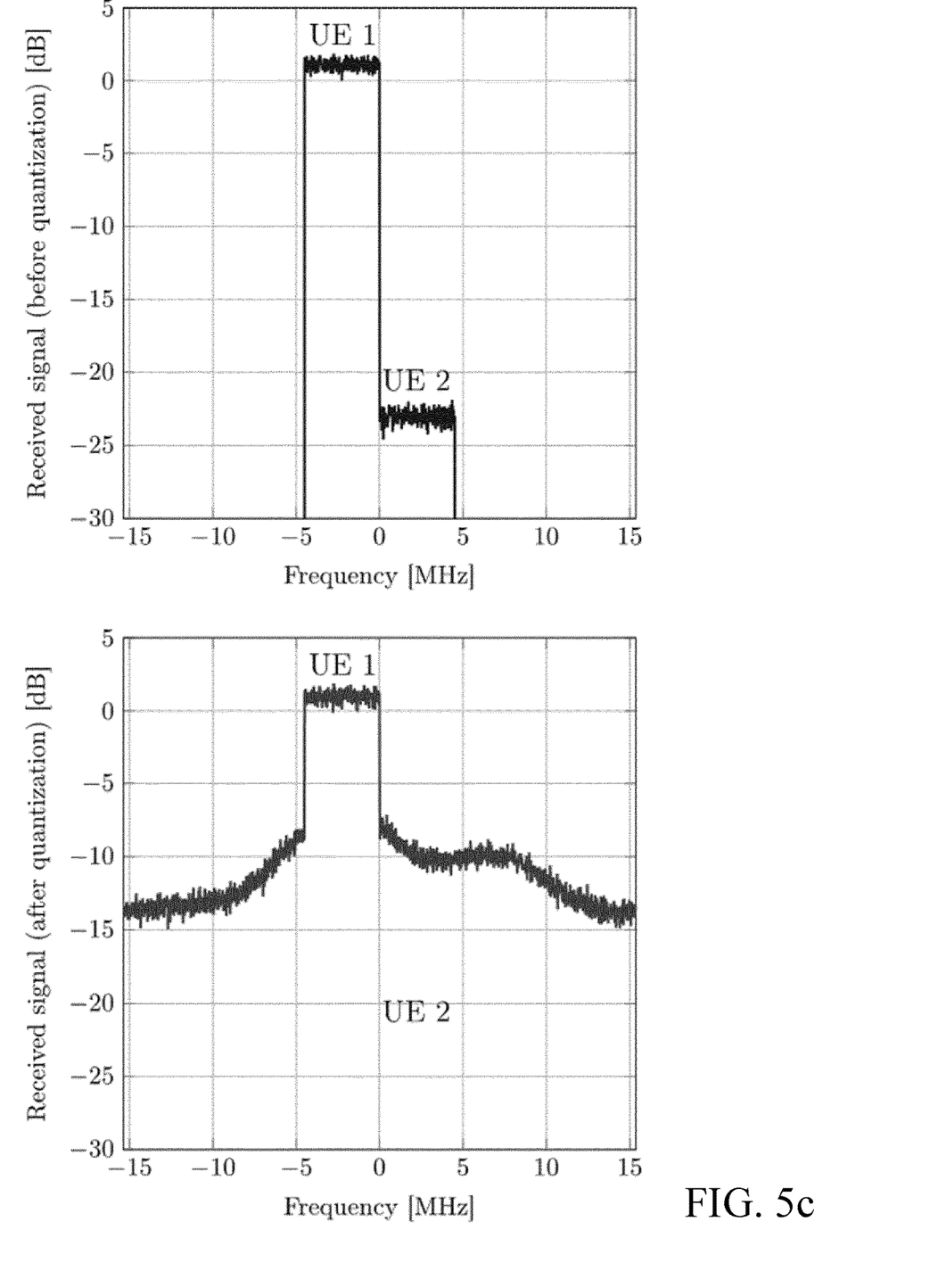

FIGS. 5a, 5b and 5c are plots illustrating measurements for various scenarios according to some embodiments. A line-of-sight propagation environment is assumed (Gaussian signaling, 32 antenna elements), in which two UEs are significantly separated in the angular domain.

In FIG. 5a, a situation is explored with two user terminals, where the first strong UE (UE 1) is located close to the RBS (and does not experience much path loss) while the second weak UE (UE 2) is located near the cell-edge (and experiences significant path loss). As discussed before, the strong UE induces a quantization distortion that adversely affects the quality of the signal received from the weak UE (after beamforming).

In FIG. 5a, the sum rate (legend "Sum rate") and the achievable rates for each of the two UEs (legends "UE1" and "UE 2") are shown as a function of the transmit power for the strong UE (UE 1) for the case when both UEs occupy the same time slots. The upper plot shows the uplink rate with 1-bit ADCs and zero-forcing (ZF) detection at the RBS. The lower plot shows the uplink rate with 3-bit ADCs and matched filter (MF) detection.

Also shown are the values resulting from the transmit power for UE 1 as set by solving either of the two optimization problems discussed above (legends "Proposed emb. (max-min)" and "Proposed emb. (sum-rate)"), as well as the values resulting from the transmit power for UE 1 as set when the sum-rate problem is solved without taking the distortion caused by the ADCs into account (legend "Benchmark").

It may be noted from these examples that the proposed solutions outperform the benchmark solution significantly in terms of throughput. Interestingly, the transmission power for UE 1 is reduced compared to the benchmark solution, while the worst-case UE throughput as well as the sum-rate throughput are improved.

In FIG. 5b, the outage probability of the achievable rate per UE is shown for the uplink (upper plot) and the downlink (lower plot) when the UEs are distributed uniformly in a circular sector with inner radius 50m and outer radius 250m. The upper plot shows the uplink case with 1-bit ADCs and zero-forcing (ZF) detection at the RBS. The lower plot shows the downlink case with 3-bit ADCs and matched filter (MF) detection.

The outage probabilities are shown for each of the two optimization problem approaches discussed above (legends "Proposed embodim. (max-min)" and "Proposed embodim. (sum-rate)"), as well as for the situation when the sum-rate problem is solved without taking the distortion caused by the ADCs into account (legend "Benchmark"). It may be noted that, in terms of worst-case UE throughput, the proposed solutions outperform the benchmark; for the uplink as well as the downlink.

FIG. 5c shows received per-antenna signal power before (upper plot) and after (lower plot) 1-bit quantization (assuming frequency division multiple access—FDMA—operation). This illustrates the near-far phenomenon discussed above.

In FIG. 5c, it is shown that the distortion caused by low-resolution ADCs is not contained to the frequency band in which the strong UE (UE 1) operates. Indeed, weak UEs (e.g. UE 2) in adjacent frequency bands are negatively affected as can be seen in the lower plot.

Hence, for low-resolution ADC architectures, assuming FDMA (or spatial division multiple access—SDMA) operation, the received signal from low-power UEs will drown in the power-dependent quantization distortion caused mainly by high-power UEs, which leads to poor performance.

It should be noted that the example above is only a very simple example provided for illustration of the near-far phenomenon.

Generally, when an arrangement is referred to herein, it is to be understood as a physical product; e.g., an apparatus.

The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 6:
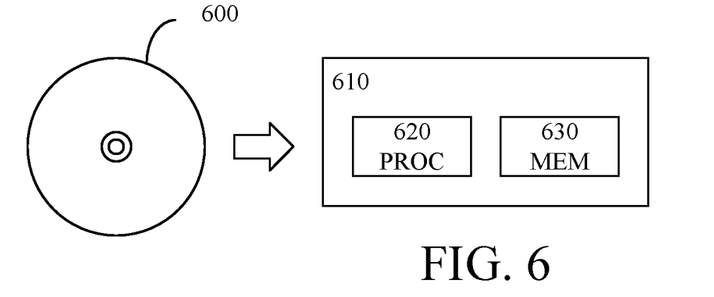
FIG. 6 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC) 620, which may, for example, be comprised in a network node 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, any of the methods illustrated in FIGS. 1-3 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of a first wireless communication device configured for massive multi-user multiple-input multiple output (MU-MIMO) communication with two or more second wireless communication devices, the first wireless communication device comprising a plurality of antenna ports, each antenna port associated with at least one of a digital-to-analog converter (DAC) and an analog-to-digital converter (ADC), the method comprising:
   acquiring an estimation of a communication channel between the first wireless communication device and the second wireless communication devices;
   acquiring an estimation of a quantization distortion caused by either DACs or ADCs; and
   jointly determining, for the two or more second wireless communication devices, a transmission power and a transmission resource for each of the second wireless communication devices, wherein the joint determination is based on the estimation of the communication channel and on the estimation of the quantization distortion, wherein
   acquiring the estimation of a quantization distortion comprises estimating the quantization distortion based at least in part on a difference between i) a first path gain for a first of the second wireless communication devices and ii) a second path gain for a second of the second wireless communication devices, or
   acquiring the estimation of a quantization distortion comprises estimating the quantization distortion based at least in part on a difference between i) a first received power for a first of the second wireless communication devices and ii) a second received power for a second of the second wireless communication devices.

2. The method of claim 1, wherein
jointly determining comprises optimizing a performance metric over an ensemble of possible transmission power values and of possible transmission resource values, and
the performance metric is based on the estimation of the communication channel and on the estimation of the quantization distortion.

3. The method of claim 2, wherein
the performance metric is a worst case device throughput for the second wireless communication devices, and
optimizing the performance metric comprises maximizing the worst case device throughput.

4. The method of claim 2, wherein
the performance metric is an overall throughput for the second wireless communication devices, and
optimizing the performance metric comprises maximizing the overall throughput.

5. The method of claim 2, wherein
the performance metric is a combined throughput metric comprising a combination of a worst case device throughput for the second wireless communication devices and an overall throughput for the second wireless communication devices, and optimizing the performance metric comprises maximizing the combined throughput metric.

6. The method of claim 1, wherein acquiring the estimation of the quantization distortion comprises estimating the quantization distortion based on parameters of the DACs or the ADCs.

7. The method of claim 6, wherein acquiring the estimation of a quantization distortion comprises estimating the quantization distortion based at least in part on the estimation of the communication channel.

8. The method of claim 1, wherein the first wireless communication device comprises a wireless transmitter, wherein each antenna port is associated with a DAC, and wherein the quantization distortion is caused by the DACs, the method further comprising:
transmitting signals to the second wireless communication devices according to the determined transmission powers and transmission resources.

9. The method of claim 8, wherein acquiring the estimation of the communication channel comprises receiving respective indications of the estimation of the communication channel from the second wireless communication devices.

10. The method of claim 1, wherein
the first wireless communication device comprises a wireless receiver,
each antenna port is associated with an ADC,
the quantization distortion is caused by the ADCs, and
the method further comprises transmitting an indication of the determined transmission power and transmission resource to each of the second wireless communication devices.

11. The method of claim 10, wherein acquiring the estimation of the communication channel comprises receiving reference signals from the second wireless communication devices and estimating the communication channel based on the received reference signals.

12. The method of claim 1, wherein the first wireless communication device is a network node and second wireless communication devices are user terminals.

13. A computer program product comprising a non-transitory computer readable medium having thereon a computer program comprising program instructions, the computer program being loadable into a data processing unit and configured to cause execution of the method according to claim 1 when the computer program is run by the data processing unit.

14. An apparatus for a first wireless communication device configured for massive multi-user multiple-input multiple output (MU-MIMO) communication with two or more second wireless communication devices, the first wireless communication device comprising a plurality of antenna ports, each antenna port associated with at least one of a digital-to-analog converter (DAC) and an analog-to-digital converter (ADC), the apparatus comprising controlling circuitry being configured to:

acquire an estimation of a communication channel between the first wireless communication device and the second wireless communication devices;
acquire an estimation of a quantization distortion caused by either DACs or ADCs; and
jointly determine for the two or more second wireless communication devices a transmission power and a transmission resource for each of the second wireless communication devices, wherein the joint determination is based on the estimation of the communication channel and on the estimation of the quantization distortion, wherein
acquiring the estimation of a quantization distortion comprises estimating the quantization distortion based at least in part on a difference between i) a first path gain for a first of the second wireless communication devices and ii) a second path gain for a second of the second wireless communication devices, or
acquiring the estimation of a quantization distortion comprises estimating the quantization distortion based at least in part on a difference between i) a first received power for a first of the second wireless communication devices and ii) a second received power for a second of the second wireless communication devices.

15. The apparatus of claim 14, wherein
the controlling circuitry is configured to cause the joint determination by causing optimization of a performance metric over an ensemble of possible transmission power values and of possible transmission resource values, and
the performance metric is based on the estimation of the communication channel and on the estimation of the quantization distortion.

16. The apparatus of claim 15, wherein
the performance metric is a worst case device throughput for the second wireless communication devices, and
optimization of the performance metric comprises maximization of the worst case device throughput.

17. The apparatus of claim 15, wherein
the performance metric is an overall throughput for the second wireless communication devices, and
optimization of the performance metric comprises maximization of the overall throughput.

18. The apparatus of claim 15, wherein
the performance metric is a combined throughput metric comprising a combination of a worst case device throughput for the second wireless communication devices and an overall throughput for the second wireless communication devices, and
optimizing the performance metric comprises maximizing the combined throughput metric.

19. The apparatus of claim 14, wherein the controlling circuitry is configured to cause the acquisition of the estimation of the quantization distortion by causing estimation of the quantization distortion based on parameters of the DACs or the ADCs.

* * * * *